US006373960B1

(12) United States Patent
Conover et al.

(10) Patent No.: US 6,373,960 B1
(45) Date of Patent: Apr. 16, 2002

(54) EMBEDDING WATERMARKS INTO COMPRESSED VIDEO DATA

(75) Inventors: Mark D. Conover, Cupertino; Fleming M. Oliver, Sunnyvale, both of CA (US)

(73) Assignee: Pixel Tools Corporation, Cupertino, CA (US)

(*) Notice: Subject to any disclaimer, the term of this patent is extended or adjusted under 35 U.S.C. 154(b) by 0 days.

(21) Appl. No.: 09/003,408

(22) Filed: Jan. 6, 1998

(51) Int. Cl.[7] ................................................. G06K 9/00
(52) U.S. Cl. ..................... 382/100; 348/412.1; 382/232
(58) Field of Search ................................. 382/100, 173, 382/232, 233, 243–236, 245–250; 380/28, 29, 200–210; 375/240, 295, 316; 713/176; 348/412.1

(56) References Cited

U.S. PATENT DOCUMENTS

| | | | | |
|---|---|---|---|---|
| 5,613,004 A | * | 3/1997 | Cooperman et al. | 380/28 |
| 5,748,783 A | * | 5/1998 | Rhoads | 382/232 |
| 5,778,102 A | * | 7/1998 | Sandford et al. | 382/251 |
| 5,809,139 A | * | 9/1998 | Girod et al. | 380/5 |
| 5,873,022 A | * | 2/1999 | Huizer et al. | 455/4.2 |
| 5,901,178 A | * | 5/1999 | Lee et al. | 375/240 |
| 5,915,027 A | * | 6/1999 | Cox et al. | 380/54 |
| 6,037,984 A | * | 3/2000 | Isnardi et al. | 348/403 |
| 6,069,914 A | * | 5/2000 | Cox | 375/150 |
| 6,108,434 A | * | 8/2000 | Cox et al. | 382/100 |

OTHER PUBLICATIONS

Cox et al., "A Secure, Robust Watermark for Multimedia", Information Hiding, NEC Research Institute, pp. 185–206, May 30, 1996.*

Cox et al., "A Secure, Imperceptable yet Perceptually Salient, Spread Spectrum Watermark for Multimedia", NEC Research Institute, Southcon '96, Jun. 25, 1996, pp. 192–197.*

Multimedia Computing and Networking 1997, Feb. 10–11, 1997, Copyright 1997, The Society of Photo–Optical Instrumentation Engineers, pp. 264–273.

Goffin, F., et al., "A Low Cost Perceptive Digital Picture Watermarking Method," SPIE vol. 3022.

Storage and Retrieval for Image and Video Database V, Feb. 13–14, 1997, Copyright 1997, The Society of Photo–Optical Instrumentation Engineers, pp. 264–277.

Hsu et al. ("DCT–Based Watermarking for Video", IEEE Transactions on Consumer Electronics, vol. 44, No. 1, Feb. 1998, pp. 206–216.*

Okon, C., "Digital Watermarking: New Techniques for Image Ownership Branding," Advanced Imaging, Oct. 1996, pp. 93–94.

Hartung, F., et al., "Watermarking of MPEG–2 Encoded Video Without Decoding and Re–Encoding," SPIE vol. 3020.

* cited by examiner

Primary Examiner—Jayanti K. Patel
(74) Attorney, Agent, or Firm—D. E. Schreiber, Esq.

(57) ABSTRACT

A for method watermarking a compressed video bitstream selects for modification numerous sites within an MPEG compressed video bitstream, each of which sites includes a DCT coefficient which is apt for modification. Watermarking sites are preferably located in MPEG B frames, and the DCT coefficient to be modified preferably has a run-length of zero (0). The method then embeds the watermark by modifying the DCT coefficient for at least some of the selected sites. A list specifying the watermarking sites may be transmitted together with the compressed video bitstream to permit further watermarking by subsequent bitstream receivers. A system for detecting an unauthorized copy of a watermarked video forms a synchronized, frame-by-frame difference between a possibly unauthorized copy of the watermarked compressed video and an un-watermarked copy of the video. Data in the watermarking site list permits readily locating watermarks within the possibly unauthorized copy.

32 Claims, 4 Drawing Sheets

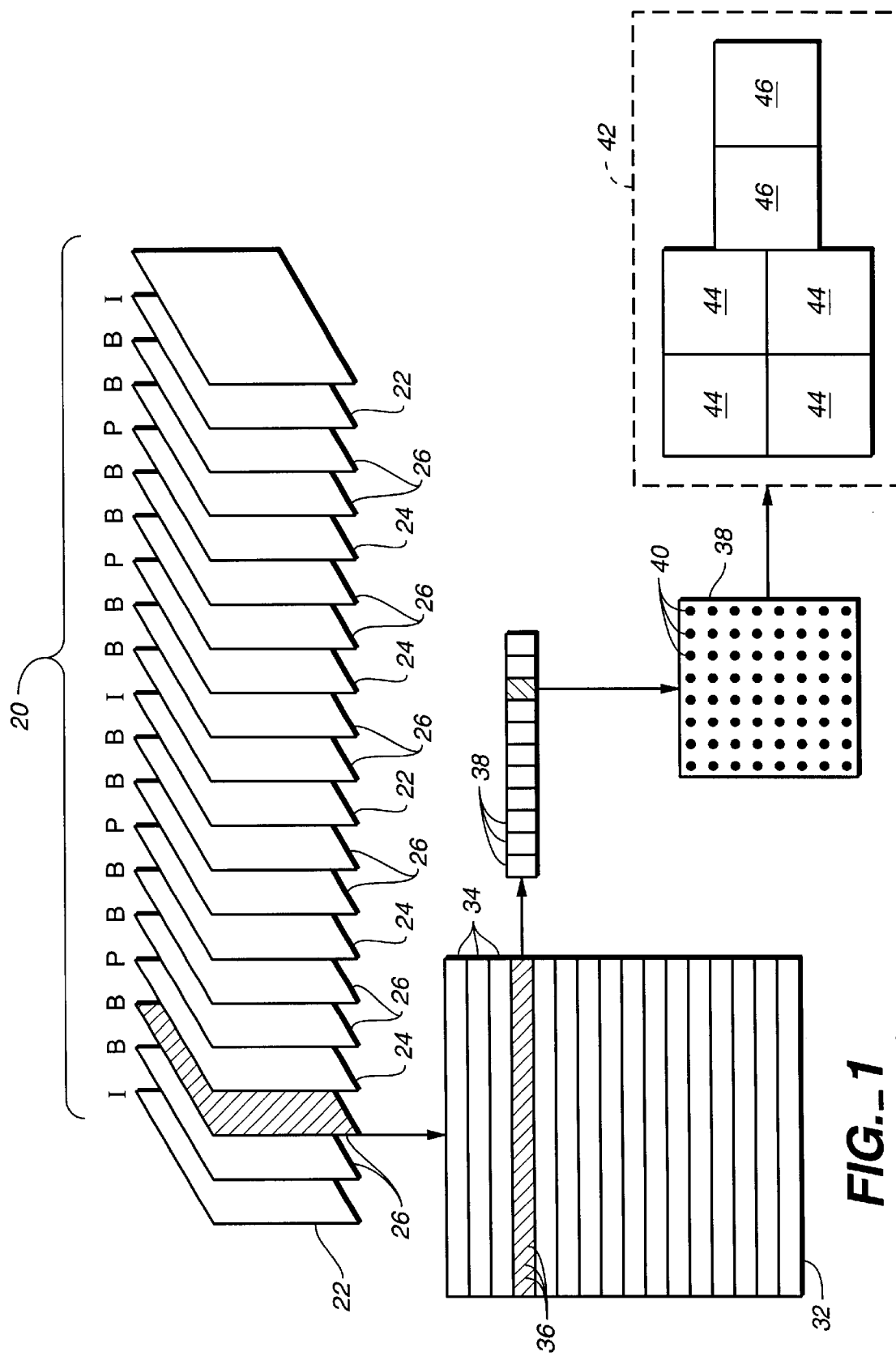
FIG._1 (PRIOR ART)

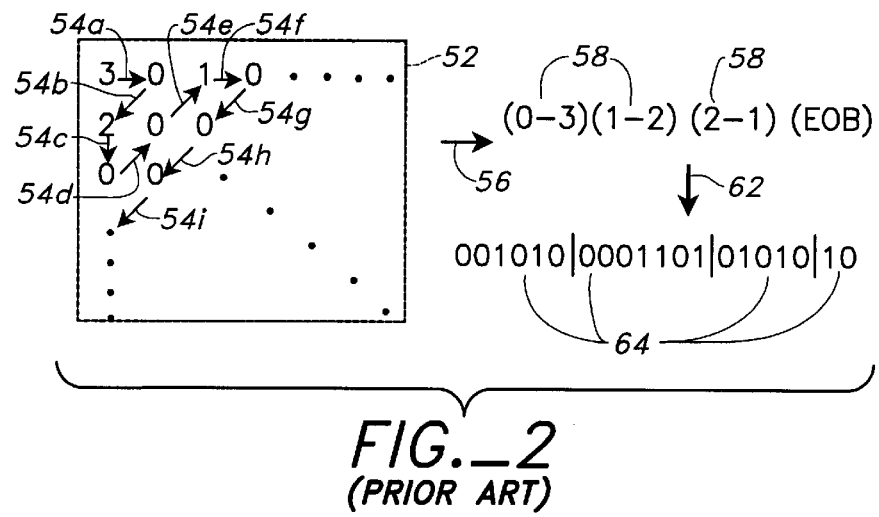
FIG._2
(PRIOR ART)
| | |
|---|---|
| 158a — | MPEG Frame Type (I, P or B) |
| 158b — | Frame Number |
| 158c — | Macroblock Location |
| 158d — | Luminance or Chromanance Modification |
| 158e — | DCT Coefficient Value |
| 158f — | DCT Coefficient Change |
| 158g — | Length of Huffman VLC |
| 158h — | Length of Run (Preferably 0) |
| 158i — | Watermarking Site Address |
FIG._6
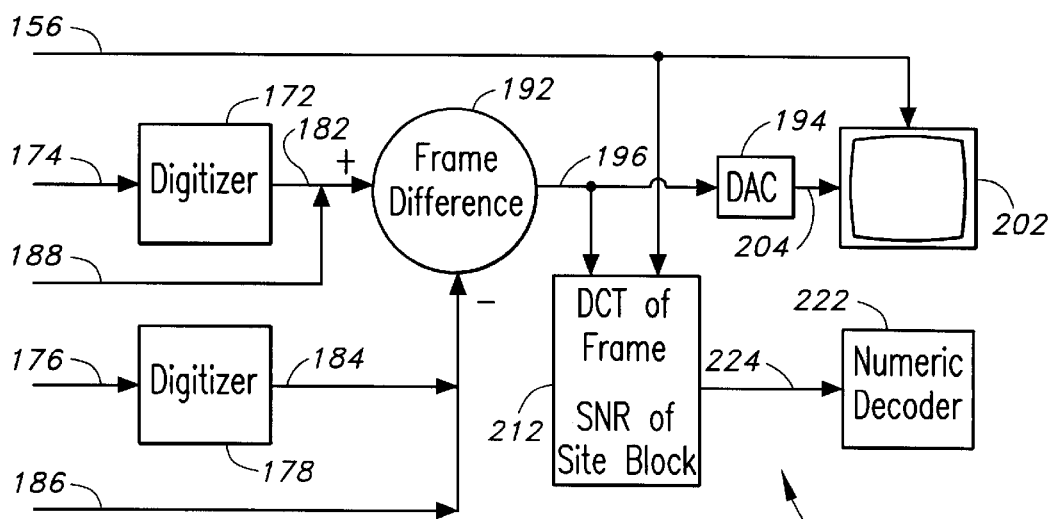
FIG._7

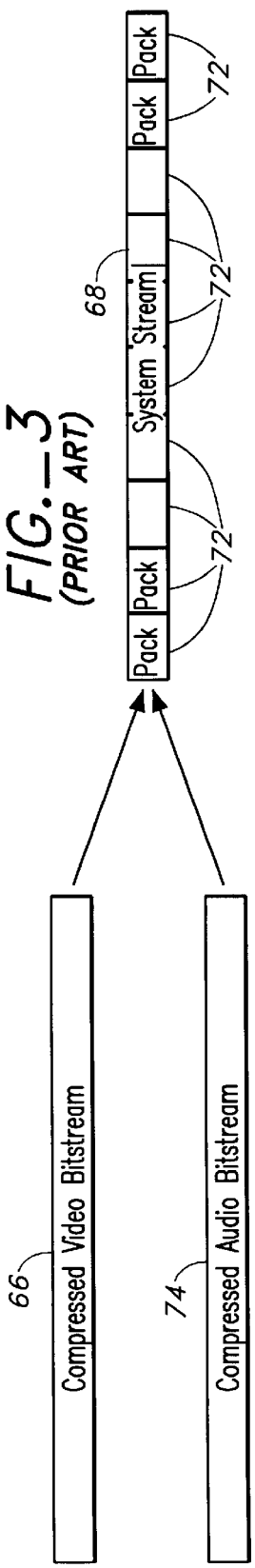
FIG._3 (PRIOR ART)
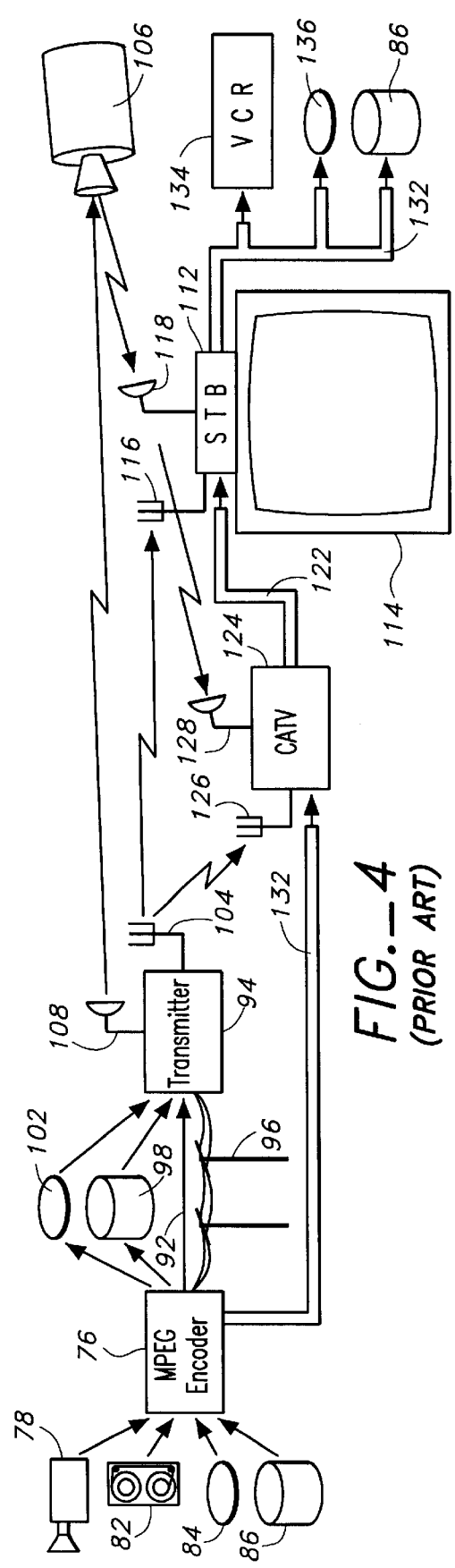
FIG._4 (PRIOR ART)
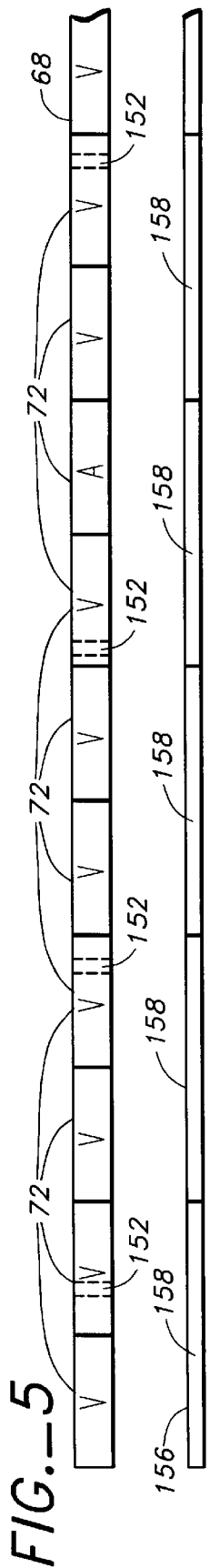
FIG._5

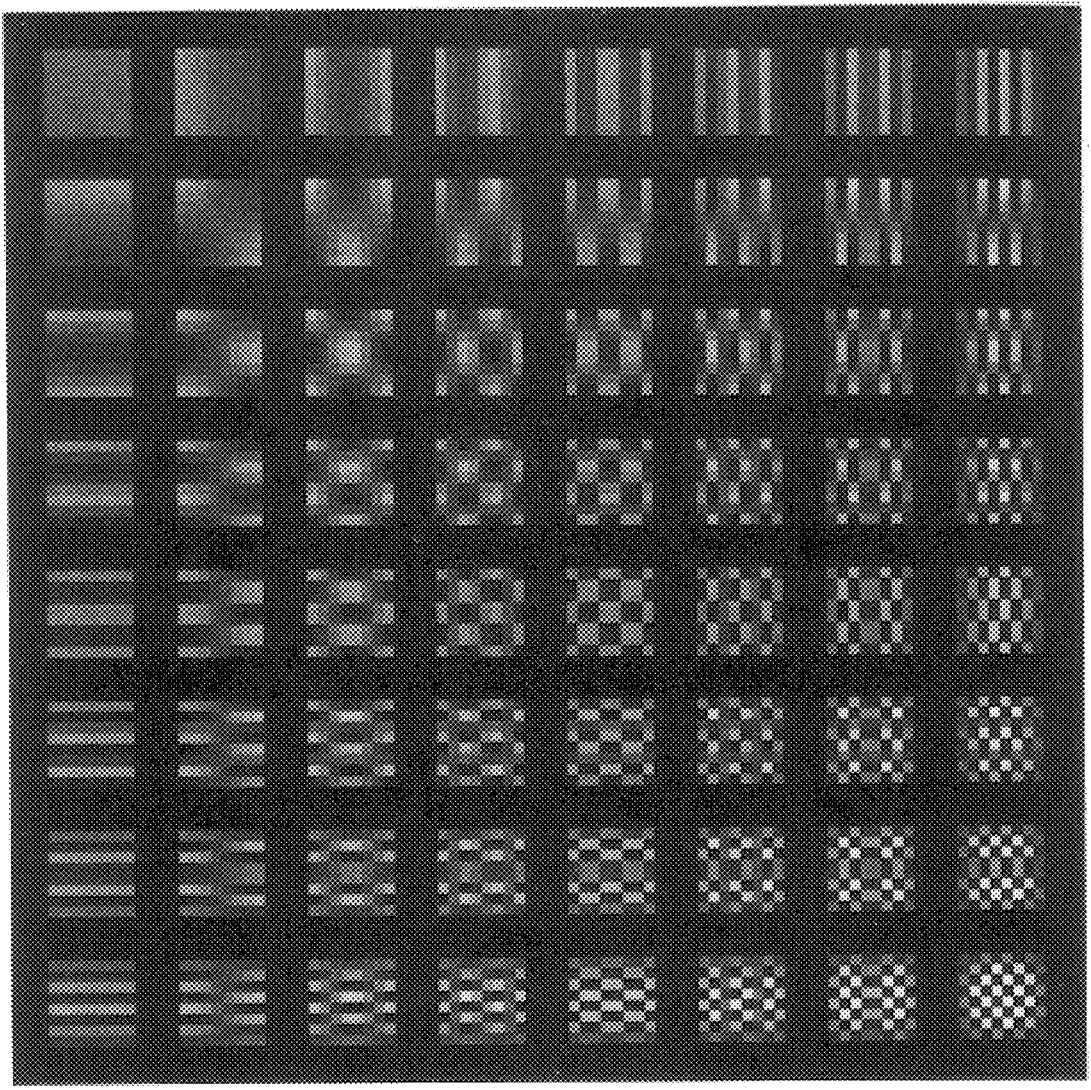
FIG._8

EMBEDDING WATERMARKS INTO COMPRESSED VIDEO DATA

BACKGROUND OF THE INVENTION

1. Field of the Invention

The present invention relates generally to devices and methods used in detecting unauthorized copying, and more particularly such devices and methods which permit detecting unauthorized copying of compressed digital video data.

2. Description of the Prior Art

Recent developments in digital video technology permit transmitting video programs by various means, including broadcasting, that have sufficient quality at a remote receiver to permit recording commercially marketable copies. It is readily apparent that owners of programming content, e.g. movie studios, broadcasting networks, independent producers, etc., are unwilling to distribute commercially valuable properties, even on a pay-per-view basis, using this improved video technology if every receiver can become a recorder for a commercially marketable copy of their property. Accordingly, various proposals have been made for embedding a humanly unobservable but automatically detectable code into video that permits identifying an unauthorized copy, and preferably permits unambiguously determining the process and equipment used in recording the unauthorized copy. Proposals for systems that are capable of embedding such unobservable but detectable codes into video are presently being identified by the word "watermarking."

An article entitled "Digital Watermarking: New Techniques for Image Ownership Branding" by Chris Okron published in the October 1996 issue of Advanced Imaging at pages 93–94 ("the Okron article") discloses embedding a bit string in a digital image which introduces minute changes into the image but the changes are typically below the ability of the human eye to detect. The article further reports that the embedded watermark can survive common image processing operations such as rotation, scaling, scanning, compression, transcoding and clipping as well as outright attacks. One specific technique reported in the article is embedding a small amount of random noise into perceptually significant components of an original digital image. Another technique reported in the article is placing an imitation of naturally occurring random image variations throughout a digital image, automatically varying the intensity of the watermark so it remains invisible in both flat and detailed ares of an image.

A technical paper entitled "A Low Cost Perceptive Digital Picture Watermarking Method" by F. Goffin, et al. published at pages 264–277 of SPIE Vol. 3022, Storage and Retrieval for Image and Video Databases V, Feb. 13–14, 1997, Copyright 1997, The Society of Photo-Optical Instrumentation Engineers ("the Goffin article"), describes embedding a watermark line-by-line going from the top to the bottom of a digital video frame. Bits of the watermark are encoded through the phase of Maximal Length Sequences ("MLS") which have good correlation properties. Underlying the embedding of the MLSs into lines of the digital video frame is a masking criterion, deduced from physiological and psychophysic studies, that guarantees the invisibility of the watermark. The retrieval of the watermark copyright information does not require using the original picture, thus no human intervention is needed for decoding the watermark. The Goffin article states that Joint Photographic Experts Group ("JPEG") digital compression does not removed an embedded MLS watermark.

Copyrighted works for which watermarking appears more difficult are digital video programs that have been compressed in accordance with the Moving Picture Experts Group ("MPEG") standards, e.g. MPEG I and MPEG II standards. MPEG I is the popular name applied to an International Organization for Standardisation ("ISO") and International Electrotechnical Commission ("IEC") standard ISO/IEC 11172. ISO/IEC has adopted a corresponding standard, ISO/IEC 13818, for MPEG II. The MPEG I and MPEG II standards respectively define serial system streams that are well suited for quality:

1. video playback from digital storage media such as a hard disk, CD-ROM, or digital video disk ("DVD"); and 2. transmission such as over a cable antenna television ("CATV") system or high bit rate digital telephone system, e.g. a T1, ISDN Primary Rate, or ATM digital telecommunications network.

A MPEG I or MPEG II system stream includes a compressed video bitstream that may decompressed to present a succession of frames of digital video data. As illustrated in FIG. 1, a MPEG compressed video bitstream consists of successive groups of pictures ("GOPS") 20. Each GOP 20 includes intra ("I") frames 22, predicted ("P") frames 24, and bidirectional ("B") frames 26. An I frame 22 of MPEG compressed digital video data is both encoded and decoded without direct reference to video data in other frames. Therefore, MPEG compressed video data for an I frame 22 represents an entire uncompressed frame of digital video data. A MPEG P frame 24 is both encoded and decoded with reference to a prior frame of video data, either reference to a prior I frame 22 or reference to a prior P frame 24. A B frame 26 of MPEG encoded digital video data is both encoded and decoded with reference both to a prior and to a successive reference frame, i.e. reference to decoded I or P frames 22 or 24. The MPEG I and MPEG II specifications define a GOP 20 to be one or more I frames 22 together with all of the P frames 24 and B frames 26 for which the one or more I frames 22 are a reference. MPEG II operates in a manner analogous to MPEG I with an additional feature that the I frames 22, P frames 24, and a B frames 26 of the MPEG I GOP 20 could be fields of the I frames 22, P frames 24, and a B frames 26, thus permitting field-to-field motion compensation in addition to frame-to-frame motion compensation.

Regardless of whether an I frame 22, a P frame 24, or a B frame 26 is being compressed, in performing MPEG compression each successive frame 32 of uncompressed digital video data is divided into slices 34 representing, for example, sixteen immediately vertically-adjacent, non-interlaced television scan lines 36. MPEG compression further divides each slice 34 into macroblocks 38, each of which stores data for a matrix of picture elements ("pels") 40 of digital video data, e.g. a 16×16 matrix of pels 40.

MPEG compression processes the digital video data for each macroblock 38 in a YCbCr color space. The Y component of this color space represents the brightness, i.e. luminance, at each pel 40 in the macroblock 38. The Cb and Cr components of the color space represent subsampled color differences, i.e. chrominance, for 2×2 groups of immediately adjacent pels 40 within the macroblock 38. Thus, each macroblock 38 consists of 6 8×8 blocks of digital video data that in the illustration of FIG. 1 are enclosed within a dashed line 42. The 6 8×8 blocks of digital video data making up each macroblock 38 includes:

1. 4 8×8 luminance blocks 44 that contain brightness data for each of the 16×16 pels 40 of the macroblock 38; and 2. 2 8×8 chrominance blocks 46 that respectively contain subsampled Cb and Cr color difference data also for the pels 40 of the macroblock 38.

In compressing all the macroblocks 38 of each I frame 22 and certain macroblocks 38 of P frames 24 and B frames 26, MPEG digital video compression separately compresses data of the luminance blocks 44 and of the chrominance blocks 46, and then combines the separately compressed blocks 44 and 46 into the compressed video bitstream.

Mathematically, the 4 luminance blocks 44 and 2 chrominance blocks 46 of each macroblock 38 respectively constitute 8×8 matrices. Referring now to FIG. 2, compressing each macroblock 38 includes independently computing an 8×8 Discrete Cosine Transform ("DCT") 52 for each of the 6 8×8 blocks 44 and 46 making up the macroblock 38. The 6 8×8 DCTs 52, only one of which is depicted in FIG. 2, respectively map the data of the 6 blocks 44 and 46 into 64 frequency coefficients. Each frequency coefficient in the DCT 52 represents a weighing factor that is applied to a corresponding basis cosine curve. The 64 basis cosine curves vary in frequency. Low cosine frequencies encode coarse luminance or chrominance structure in the macroblock 38. High cosine frequencies encode detail luminance or chrominance features in the macroblock 38. Adding together the basis cosine curves weighted by the 64 DCT coefficients reproduces exactly the 8×8 matrix of an encoded block 44 or 46.

By themselves, the coefficients of the DCT 52 for a block 44 or 46 provide no compression. However, because video data for most macroblocks 38 lack detail luminance or chrominance features, most high-frequency coefficients for the DCTs 52 are typically zero (0) or near zero (0). To further increase the number of zero coefficients in each DCT 52, MPEG encoding divides each coefficient by a quantization value which generally increases with the frequency of the basis cosine curve for which the coefficient is a weight. Dividing the coefficients of the DCT 52 by their corresponding MPEG quantization values reduces image detail. Large numeric values for quantization reduce detail more, but also provide greater data compression for reasons described in greater detail below.

After quantizing the DCT 52, the quantized frequency coefficients are processed in a zigzag order as indicated by arrows 54a–54i in FIG. 2. Applying a zigzag order to the quantized frequency coefficients tends to produce long sequences of DCT frequency coefficients having zero (0) value. Run-length encoding, indicated by an arrow 56 in FIG. 2, is then applied to the zigzag order of the quantized DCT coefficients. For those quantized DCT coefficients that differ from the immediately preceding and succeeding DCT coefficient along the zigzag path, run-length encoding specifies a run-length of zero (0), i.e. a single occurrence of the quantized DCT coefficient. Long sequences of zero (0) coefficients along the zigzag path depicted in FIG. 2, are efficiently encoded using a lesser amount of data. MPEG run-length encoding represents each such sequence of consecutive identical valued quantized frequency coefficients by a token 58, depicted in FIG. 2, which specifies how many consecutive quantized frequency coefficients have the same value together with the numerical value for that set of quantized frequency coefficients.

The tokens 58 extracted from the sequence of quantized frequency coefficients are then further compressed through Huffman coding, indicated by an arrow 62 in FIG. 2. Huffman coding converts each token 58 into a variable length code ("VLC") 64. MPEG assigns values that are only 2–3 binary digits ("bits") long for the VLCs 64 representing the most common tokens 58. Conversely, MPEG video compression assigns values that are up to 28 bits long for the VLCs 64 representing rare tokens 58. The Huffman coded VLCs 64 thus determined are then appropriately merged into a MPEG compressed video bitstream 66 depicted in FIG. 3.

As illustrated in FIG. 3, a serial MPEG system stream 68 is assembled by concatenating packs 72 of compressed data selected respectively from a MPEG compressed audio bitstream 74 and from the compressed video bitstream 66. The compressed video bitstream 66 and the compressed audio bitstream 74 are both prepared and merged into the system stream 68 by a MPEG encoder 76 depicted in FIG. 4. In the illustration of FIG. 4, the MPEG encoder 76 receives either an analog or a digital video signal from any one of various video sources such as from a video camera 78, from a video tape player 82, from a video disk player 84 or from some other type of video-data storage-device 86. As indicated by an arrow 92 in FIG. 4, the system stream 68 thus assembled by the MPEG encoder 76 may be supplied directly in real-time to a broadcast transmitter 94 located near to the MPEG encoder 76. Alternatively, the system stream 68 may be supplied in real-time to a remotely located broadcast transmitter 94 via some communication channel such as a T1, ISDN Primary Rate, or ATM digital telecommunications network 96. For non-real-time applications, the MPEG encoder 76 may record the system stream 68 onto a general purpose digital video-data storage-device 98 or onto a special purpose digital video-disk storage-device 102 such as a CD-ROM or DVD from which it is subsequently reproduced and supplied to the broadcast transmitter 94.

The broadcast transmitter 94 itself then distributes the system stream 68 in various different ways such to receivers located in some geographic area as a high frequency ("HF") or ultra-high frequency ("UHF") signal that is broadcast conventionally from an antenna 104, or to a satellite 106 via a conventional microwave dish 108. As depicted in FIG. 4, a set-top box ("STB") 112 that is coupled to a conventional television set 114 may receive the HF or UHF broadcast system stream 68 with an antenna 116, or receive the system stream 68 from the satellite 106 with a conventional microwave dish 118. Yet another way in which the STB 112 may receive the system stream 68 is a coaxial-cable feed 122 provided by a cable antenna television ("CATV") service 124. As illustrated in FIG. 4, the CATV service 124 may itself receive the broadcast system stream 68 indirectly with an antenna 126 from the antenna 104 or with a microwave dish 128 from the satellite 106, or directly from the MPEG encoder 76 via a coaxial-cable feed 132 or other real-time communication channel such as a T1, ISDN Primary Rate, or ATM digital telecommunications network.

As described above, regardless of how the STB 112 receives the system stream 68, the video and audio signals at the STB 112 have sufficient quality to permit recording commercially marketable copies of works that have been decoded from the MPEG encoded system stream 68. Thus, in addition to or instead of providing an analog video signal decoded from the MPEG encoded system stream 68 to the television set 114, unauthorized copies may be made at the STB 112 by supplying the high-quality decoded analog video signal to a video cassette recorder ("VCR") 134, to a video-disk recorder 136, or to a video-data storage-device 86

A technical paper entitled "Watermarking of MPEG-2 Encoded Video Without Decoding and Re-Encoding" by F. Hartung, et al. published at pages 264–273 of SPIE Vol. 3020, Multimedia Computing and Networking 1997, Feb. 10–11, 1997, Copyright 1997, The Society of Photo-Optical Instrumentation Engineers ("the Hartung article"), describes a technique, similar to that proposed in the Okron article, for adding a noise-like signal to video pels. To add a noise-like watermark to MPEG a compressed video bitstream the Hartung article proposes:

1. decoding Huffman encoded non-zero DCT coefficients of the compressed video data stream to obtain the DCT coefficient;
2. adding the corresponding DCT coefficient from DCT processed watermark signal to the decoded DCT coefficient;
3. re-quantize and re-Huffman encode the watermarked DCT coefficient; and
4. if substituting the watermarked DCT coefficient into the compressed video data stream will not increase the bit rate, replacing the un-watermarked DCT coefficient with the watermarked DCT coefficient.

Altering existing a MPEG compressed video bitstream can result in image drift by which an alteration made to a prior frame of MPEG compressed video data may continue to appear during presentation of subsequent frames of decompressed video data. Accordingly, the Hartung article further explains that in watermarking a MPEG compressed video bitstream drift compensation data must also be added which encodes the difference between digital video data predicted using the un-watermarked compressed digital video data and that predicted using the watermarked compressed digital video data.

SUMMARY OF THE INVENTION

An object of the present invention is to apply a watermark to compressed digital video data that appears imperceptibly but detectably in digital video data decompressed therefrom.

Another object of the present invention is apply a watermark to compressed digital video data that it is impractical, preferably impossible, to remove even if the basic watermarking technique were publicly known.

Another object of the present invention is to apply a watermark to compressed digital video data that is distributed throughout a sequence of video frames.

Another object of the present invention is to apply a watermark to compressed digital video data that cannot be removed by an unauthorized party without unacceptably degrading image quality.

Another object of the present invention is apply a watermark to compressed digital video data that is capable of unambiguously identifying the process and equipment used in recording an unauthorized copy.

Another object of the present invention is to apply a watermark to compressed digital video data easily.

Another object of the present invention is to apply a watermark to compressed digital video data without decompressing the compressed digital video data.

Another object of the present invention is to apply a watermark to compressed digital video data knowing only locations within the compressed digital video data at which the watermark is to be applied.

Another object of the present invention is to apply a watermark to compressed digital video data that does not increase the compressed video data bit-rate.

Another object of the present invention is apply to compressed digital video data a watermark that can be augmented at each step in transmitting the compressed digital video data.

Another object of the present invention is to apply a watermark to compressed digital video data that persists through recompression of decompressed digital video data.

Briefly, the present invention in one aspect includes a method for adding a watermarks to a compressed video bitstream. The method selects a plurality of sites within the compressed video bitstream that encode a DCT coefficient which is apt for modification to embed a watermark into the compressed video bitstream. While various criteria described in greater detail below affect the selection of apt sites for watermarking, such sites are preferably located in MPEG B frames 26, and the DCT coefficient to be modified preferably has a run-length of zero (0). Having determined a plurality of watermarking sites, the method then modifies the DCT coefficient for at least some of the selected plurality of sites thereby embedding the watermark into the compressed video bitstream. The watermarked compressed video bitstream containing the modified DCT coefficients is then transmitted by any of various different methods well known to those skilled in the art for reception and presentation of the watermarked video.

In another aspect the present invention includes a system for detecting an unauthorized copy of a video by identifying a watermark embedded into a compressed video bitstream. The watermarked compressed video bitstream is produced from an un-watermarked video by changing values of selected DCT coefficients at watermarking sites in the compressed video bitstream. The system detecting an unauthorized copy includes an original video input for receiving a video signal of the un-watermarked video, and a copy video input for receiving a video signal of the copy of the video which may possibly include the watermark. A frame differencer also included in the system receives from the original and copy video input the received video signals, and produces a synchronized, frame-by-frame difference between the video signals.

The system includes means for identifying the watermark when embedded into the video signal received by the copy video input. This watermark identification means may be implemented in two (2) different ways, or in both ways. Either of the two (2) watermark identification means receives the frame-by-frame difference produced by the frame differencer and also receives a site list containing data which specifies characteristics of sites at which the watermark may be embedded into the video signal received by the copy video input. One watermark identification means includes a digital-to-analog converter that receives the frame-by-frame difference produced by the frame differencer and converts the difference into an analog video signal. This particular watermark identification means also includes a video monitor for receiving the analog video signal produced by the digital-to-analog converter and for visually displaying watermarking sites. An alternative watermark identification means includes a frame analyzer that receives the frame-by-frame difference produced by the frame differencer, and automatically determines if a watermark occurs at a watermarking site. A particularly preferred embodiment of the frame analyzer computes a signal-to-noise ratio ("SNR") between the DCT coefficient at the watermarking site in a DCT computed from the frame-by-frame difference, and other coefficients of the DCT computed from the frame-by-frame difference.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a block diagram illustrating how frames of digital video data are processed to extract macroblocks and luminance and chrominance blocks during compression in accordance with the prior art MPEG standards;

FIG. 2 is a block diagram depicting application first of the prior art DCT, then run-length coding, and finally Huffman coding to luminance and chrominance blocks that make up macroblocks extracted from a frame of digital video data as illustrated in FIG. 1;

FIG. 3 is a diagram graphically depicting interleaving packets selected from a compressed audio bitstream with packets selected from a compressed video bitstream to assemble a system stream;

FIG. 4 is a block diagram illustrating a system for a encoding video signal into a compressed bitstream, and then distributing the compressed bitstream to a set top box for decoding back into an analog video signal for display on a television set;

FIG. 5 is a diagram illustrating a system stream assembled by interleaving packets selected from a compressed audio bitstream with packets selected from a compressed video bitstream in which watermarking sites have been selected, together with a site data list that contains data about each of the watermarking sites;

FIG. 6 is a data structure diagram depicting data stored into an individual entry of the site data list depicted in FIG. 5;

FIG. 7 is a block diagram depicting a system used in detecting an unauthorized copy of a compressed video bitstream or a system stream; and FIG. 8 is a diagram depicting various different patterns that may appear on a video monitor due to watermarking of a compressed video bitstream or a system stream in accordance with the present invention.

DETAILED DESCRIPTION OF THE PREFERRED EMBODIMENT

Referring again to FIGS. 3 and 4, the present invention is a method for adding a watermark to the compressed video bitstream 66 which may be effected either before or after the compressed video bitstream 66 is assembled into the system stream 68. A watermarking method in accordance with the present invention may or may not include selecting a plurality of sites 152, depicted in FIG. 5, that are located within the compressed video bitstream 66, or located within packs 72 of the system stream 68 that were selected from the compressed video bitstream 66. In accordance with the present invention the selected sites 152 in the compressed video bitstream 66, or in packs 72 of the system stream 68 that were selected from the compressed video bitstream 66, are those that encode a coefficient of the luminance and/or chrominance DCT 52 which is apt for modification to embed a watermark into the compressed video bitstream 66, or in packs 72 of the system stream 68 that were selected from the compressed video bitstream 66. A watermarking method in accordance with the present invention also includes modifying the coefficient of the luminance and/or chrominance DCT 52 for at least some of the selected plurality of sites 152 thereby embedding the watermark into the compressed video bitstream 66, or into packs 72 of the system stream 68 that were selected from the compressed video bitstream 66.

As will be readily appreciated by those skilled in the art, both the selecting of sites 152 and the modifying coefficients of the luminance and/or chrominance DCT 52 to embed the watermark into the compressed video bitstream 66, or into packs 72 of the system stream 68 that were selected from the compressed video bitstream 66, may, in principle, be performed independently by each of the MPEG encoder 76, the broadcast transmitter 94, the satellite 106, the STB 112, and/or the CATV service 124. If the MPEG encoder 76, the broadcast transmitter 94, the satellite 106, and/or the CATV service 124 watermark the compressed video bitstream 66, or watermark the packs 72 of the system stream 68 that were selected from the compressed video bitstream 66, then the MPEG encoder 76 transmits, and the broadcast transmitter 94, the satellite 106, the STB 112, and/or the CATV service 124 re-transmit, the watermarked compressed video bitstream 66, or the watermarked packs 72 of the system stream 68 that were selected from the compressed video bitstream 66. Thus, the MPEG encoder 76 may select the sites 152 concurrently with generating the compressed video bitstream 66, or the packs 72 of the system stream 68 that were selected from the compressed video bitstream 66. Alternatively, the MPEG encoder 76 may select the sites 152 after generating the compressed video bitstream 66, or the packs 72 of the system stream 68 that were selected from the compressed video bitstream 66. If the broadcast transmitter 94, the satellite 106, the STB 112, and/or the CATV service 124 autonomously select the watermarking sites 152, then they must receive the compressed video bitstream 66, or the packs 72 of the system stream 68 that were selected from the compressed video bitstream 66, before selecting the sites 152. If the STB 112 watermarks the compressed video bitstream 66, or watermarks the packs 72 of the system stream 68 that were selected from the compressed video bitstream 66, then the STB 112 decodes the compressed video bitstream 66 containing the modified coefficients of the DCT 52 to produce therefrom an analog video signal that is suitable for display on a television, and that has the watermark embedded therein.

Each of the MPEG encoder 76, the broadcast transmitter 94, the satellite 106, the STB 112, and/or CATV service 124 may autonomously analyze the compressed video bitstream 66, or the packs 72 of the system stream 68 that were selected from the compressed video bitstream 66, to locate coefficients of the luminance and/or chrominance DCT 52 which are apt for modification to embed a watermark into the compressed video bitstream 66, or into the packs 72 of the system stream 68 that were selected from the compressed video bitstream 66. However, such autonomous watermarking by the MPEG encoder 76, the broadcast transmitter 94, the satellite 106, the STB 112, and/or CATV service 124 has at least two disadvantages. First, autonomous watermarking requires that the broadcast transmitter 94, the satellite 106, the STB 112, and/or CATV service 124 be comparatively complex, and that each independently possesses a capability for analyzing the compressed video bitstream 66, or the packs 72 of the system stream 68 that were selected from the compressed video bitstream 66, to select the sites 152. Second, if each of the MPEG encoder 76, the broadcast transmitter 94, the satellite 106, the STB 112, and/or CATV service 124 autonomously selects watermarking sites 152, then a possibility exists that watermarking embedded by subsequent processing of the compressed video bitstream 66, or of the packs 72 of the system stream 68 that were selected from the compressed video bitstream 66, may overwrite watermarking embedded by an prior processing of the compressed video bitstream 66, or of the packs 72 of the system stream 68 that were selected from the compressed video bitstream 66.

Accordingly, as illustrated in FIG. 5 a preferred embodiment of the present invention includes also transmitting together with the watermarked compressed video bitstream 66, or packs 72 of the system stream 68 that were selected from the compressed video bitstream 66, a site data list 156 that includes site data entries 158 which store various data about each watermarking site 152. Thus, any of the MPEG encoder 76, the broadcast transmitter 94, the satellite 106, and/or CATV service 124 which autonomously selects watermarking sites 152 may also prepare the site data list 156 for transmission together with the watermarked compressed video bitstream 66, or packs 72 of the system stream 68 that were selected from the compressed video bitstream 66. After any one of the MPEG encoder 76, the broadcast transmitter 94, the satellite 106, or CATV service 124 has prepared the site data list 156 and transmitted it together with the compressed video bitstream 66, or packs 72 of the system stream 68 that were selected from the compressed video bitstream 66, a subsequent broadcast transmitter 94, satellite 106, CATV service 124, or STB 112 need only refer to the site data list 156 to select sites 152 for watermarking.

FIG. 6 lists various data included in the site data list 156 for each site data entry 158 that are used in detecting unauthorized copying. As illustrated in FIG. 6, the site data entry 158 for each of the sites 152 stores data specifying the type of MPEG frame 158a, i.e. I frame 22, P frame 24, or B frame 26, that has been selected for watermarking. To specify the location of the site 152 within a program, each site data entry 158 also stores data specifying the frame number 158b and the macroblock location 158c of the site 152 within the frame. To specify the modification to be made in watermarking each site 152, the site data entry 158 also stores data specifying if the watermarking is to be a luminance or chrominance modification 158d; a DCT coefficient value 158e, i.e. the value of the coefficient of the DCT 52 that is to be modified; and a DCT coefficient change 158f for the coefficient of the DCT 52. To specify the characteristic of the compressed video bitstream 66 at each site 152, each site data entry 158 specifies a length of the Huffman VLC 158g at the site 152 and a length for the run 158h of tokens 58 for the Huffman encoded VLC at the site 152, which preferably has a zero (0) run-length. Finally each site data entry 158 includes a watermarking site address 158i preferably specified by the number of bits between the start of the compressed video bitstream 66 or the system stream 68, or between a designated time code or entry point in the compressed video bitstream 66 or the system stream 68, and a bit to be used in watermarking this site 152. After the site data list 156 has been generated, if as a result of selecting specific watermarking parameters the watermarking site address 158i specifies a bit in the compressed video bitstream 66, or packs 72 of the system stream 68 that were selected from the compressed video bitstream 66, that need only be inverted to watermark the site 152, then the most data that a broadcast transmitter 94, satellite 106, CATV service 124, or STB 112 must receive from the site data list 156 to perform watermarking is the watermarking site address 158i.

Considerations for Selecting Sites 152

Certain considerations are to be applied in identifying VLCs 64 in the compressed video bitstream 66 or the system stream 68 which provide sites 152 that are suitable for watermarking modification. First, MPEG B frames 26 are to be highly preferred for watermarking sites 152 because a watermark embedded into a B frame 26 cannot propagate spatially within the frame 32, or temporally into adjacent frames. Conversely, because B frames 26 are decoded with reference both to a prior and to a successive reference frame, i.e. reference to decoded I or P frames 22 or 24, a watermark encoded into either a I or P frames 22 or 24 will likely propagate both spatially and temporally throughout a number of B frames 26. Analogously, because a P frame 24 is decoded with reference to a prior frame of video data, e.g. a prior I frame 22, a watermark encoded into an I frame 22 will likely propagate both spatially and temporally into the P frames 24 and the B frames 26 of the GOP 20.

Similarly, as set forth above, VLCs 64 having a zero (0) run-length are to be preferred because a watermark embedded in such a VLC 64 modifies a coefficient for only a single basis cosine curve. Conversely, embedding a watermark in a VLC 64 having a run-length greater than zero (0) modifies coefficients for two or more basis cosine curves within that luminance block 44 or chrominance block 46. Moreover, as set forth above, MPEG encoding encourages long run-lengths for sequences along the zigzag path of coefficients having a zero (0) value. Therefore, VLCs 64 having a run-length of zero (0) are comparatively rare, and are therefore likely to be encoded into a longer rather than into a shorter VLC 64. The presence of more bits in a VLC 64 increases the likelihood that the VLC 64 may provide a suitable site 152 for watermarking.

VLCs 64 that permit easily modifying the coefficient of the basis cosine curve without changing the length of the VLC 64 are preferable. Such VLCs 64 permit embedding the watermark into the compressed video bitstream 66 or the system stream 68 without changing their respective lengths. However, permitting changes in the respective lengths of the compressed video bitstream 66 and system stream 68 increases the number of VLCs 64 that may provide a suitable site 152 for watermarking.

Another consideration in selecting watermarking sites 152 is that a coefficient of higher frequency basis cosine curves of the DCT 52 is preferred over a coefficient of lower frequency basis cosine curves. Modification of a coefficient of higher frequency basis cosine curve of the DCT 52 tends to be less observable than a modification made to a coefficient of a lower frequency basis cosine curve. However, watermarks embedded into the compressed video bitstream 66 or the system stream 68 by modifying coefficients of higher-frequency basis cosine curves tend to be attenuated more by poorer quality analog copying. Consequently, ensuring that a watermark survives analog copying may require larger changes in the coefficient for a higher-frequency basis cosine curve than for the coefficient of a lower-frequency basis cosine curve.

Within a single macroblock 38, DCTs 52 may exist for four (4) luminance blocks 44 and for two (2) chrominance blocks 46. Another consideration in selecting watermarking sites 152 is that a modification made to a coefficient of the DCT 52 for either of the two (2) chrominance blocks 46 are generally less visible and less detectable than modifications made to a coefficient of DCTs 52 for any of the four (4) luminance blocks 44. It is also to be noted that a modification made to a coefficient of one (1) of the DCTs 52 for either of the two (2) chrominance blocks 46 appears throughout the entire macroblock 38. Conversely, a modification made to a coefficient of one (1) of the DCTs 52 for any of the four (4) chrominance blocks 46 appears only within one quadrant of the macroblock 38.

Yet another consideration is selecting sites 152 is that randomness of watermarking, both in position within the frame 32 and temporally, reduces observability. The inherent nature of MPEG compression prevents selecting watermarking sites 152 at precise positions within the frame 32 or at a precise time. Consequently:

1. to some extent MPEG compression inherently randomizes the spatial and temporal location for watermarking sites 152; and 2. the site data list 156 generated during selection of watermarking sites 152 must be preserved for subsequent use in detecting whether a copy of a work is authorized or unauthorized.

However, care must be exercised to avoid selecting watermarking sites 152 that are located too close to the edges of the frame 32 since watermarks located there may be obliterated during poorer quality analog copying.

Considerations for Modifying Sites 152

Various considerations are to be applied in determining precisely how coefficients of the basis cosine functions are to be modified at watermarking sites 152. Moreover, some of the considerations pertinent to modifying coefficients of the basis cosine functions affect considerations that are pertinent to selecting watermarking sites 152.

Both how severely a site 152 must be modified to embed a watermark that is capable of surviving corruption in conversion into the analog video signal by the STB 112, and the frequency at which watermarks occur depend upon each particular application for the present invention. However, since several different possibilities exist for modifying the coefficients for basis cosine curves of the DCT 52 in embedding a watermark into the compressed video bitstream 66 or the system stream 68, using the method of the present invention permits watermarking MPEG compressed video data under all real-world conditions. The sole issue is precisely how sites 152 are to be selected for watermarking, and precisely how watermarking sites 152 are to be modified.

Perhaps the simplest modification that may be used for water-marking the compressed video bitstream 66 or the system stream 68 is to change the sign of the coefficient of a basis cosine curve of the DCT 52. That is, if the sign of the coefficient is plus (+), it may be changed to minus (−), or conversely. Analogously, modifying the magnitude of the coefficient of a basis cosine curve of the DCT 52 may be used for watermarking the compressed video bitstream 66 or the system stream 68. Thus, watermarking a site 152 may consist in changing the DCT coefficient, preferably to a DCT coefficient having the same number of bits as the DCT coefficient being replaced.

If a DCT coefficient value has a run-length of zero (0), the following table specifies encodings for forty (40) different possible numerical values of that DCT coefficient. Each table entry specifies, by two (2) hexadecimal numbers, a bit-pattern to be used for encoding a particular DCT coefficient value, and, by arabic numerals, the number of bits which are used for encoding that DCT coefficient. If the bit-pattern to be used for encoding a particular DCT coefficient value that is specified by the two hexadecimal digits has fewer bits than that specified for the encoding, then sufficient zeros (0s) are prefixed onto the specified bit-pattern to provide the required number of bits. The upper left hand entry in the table specifies the encoding for lowest value DCT coefficient, i.e. one (1), while the lower right hand entry in the table specifies the encoding for the highest value DCT coefficient, i.e. forty (40). Values for the DCT coefficient increase sequentially from left to right across each horizontal row in the table. Analogously, all values of the DCT coefficients whose encodings are specified by a horizontal row of the table have a lower numerical value than the DCT coefficient values whose encodings are specified by the immediately following horizontal row of the table.

| {0x03, 2}, | {0x04, 4}, | {0x05, 5}, | {0x06, 7} |
|---|---|---|---|
| {0x26, 8}, | {0x21, 8}, | {0x0a, 10}, | {0x1d, 12} |
| {0x18, 12}, | {0x13, 12}, | {0x10, 12}, | {0x1a, 13} |
| {0x19, 13}, | {0x18, 13}, | {0x17, 13}, | {0x1f, 14} |
| {0x1e, 14}, | {0x1d, 14}, | {0x1c, 14}, | {0x1b, 14} |
| {0x1a, 14}, | {0x19, 14}, | {0x18, 14}, | {0x17, 14} |
| {0x16, 14}, | {0x15, 14}, | {0x14, 14}, | {0x13, 14} |
| {0x12, 14}, | {0x11, 14}, | {0x10, 14}, | {0x18, 15} |
| {0x17, 15}, | {0x16, 15}, | {0x15, 15}, | {0x14, 15} |
| {0x13, 15}, | {0x12, 15}, | {0x11, 15}, | {0x10, 15} |

Thus, the preceding table specifies that if a run-length of zero (0) occurs for a DCT coefficient having a numerical value of one (1), then that coefficient is encoded as the low order two (2) bits of the hexadecimal number 03, i.e. 11.

$$\{0x03,\ 2\} = 000\ 0000\ 0000\ 00\overset{0}{1}\overset{3}{1}$$

If a run-length of zero (0) occurs for a DCT coefficient having a numerical value of ten (10), then that coefficient is encoded as the low order twelve (12) bits of the hexadecimal number 13, i.e. 0000 0001 0011.

$$\{0x13,\ 12\} = 000\ \mathbf{0000}\ \mathbf{000\overset{1}{1}}\ \mathbf{00\overset{3}{1}1}$$

If a run-length of zero (0) occurs for a DCT coefficient having a numerical value of eight (8), then that coefficient is encoded as the low order twelve (12) bits of the hexadecimal number 1d, i.e. 0000 0001 1100.

$$\{0x1d,\ 12\} = 000\ \mathbf{0000}\ \mathbf{000\overset{1}{1}}\ \mathbf{1\overset{d}{1}00}$$

Thus, as is readily apparent from the preceding description, if MPEG compression encodes a DCT coefficient having a run length of zero (0) and a numerical value of ten (10) into the VLC 64 for a watermarking site 152, then that encoded DCT coefficient may be arbitrarily replaced with the encoding for a DCT coefficient having the numerical value eight (8), or conversely, without changing the length of the compressed video bitstream 66 or the system stream 68.

The precise meaning ascribed to the presence, or even the absence, of modification at watermarking sites 152 is beyond the scope of the present invention. Precisely how watermarking in accordance with the present invention is to be utilized and the precise meaning of the information encoded into the watermarks depends upon a protocol for each particular application of the present invention. However, the present invention is capable of encoding and subsequently reproducing any information required to implement a particular protocol. Protocols for encoding such information may be selected which provide very robust error correction thereby increasing the likelihood of detecting an unauthorized copy of a watermarked compressed video bitstream 66 or system stream 68.

Detecting Unauthorized Copying

FIG. 7 depicts a system, indicated by the general reference character 170 that may be employed for detecting whether a copy originates in the watermarked compressed video bitstream 66 or system stream 68. In the system 170 depicted in FIG. 7, a first video digitizer 172 receives an analog video signal, indicated by an arrow 174, that is the original, un-watermarked video such as that produced by the video camera 78, video tape player 82, video disk player 84 or video-data storage-device 86. An analog video signal from a suspected copy of the watermarked video, indicated by an arrow 176, is supplied to a second video digitizer 178 in frame synchronization with the analog video signal supplied to the first video digitizer 172. Digitized video data produced both by the first video digitizer 172 and by the second video digitizer 178, indicated by arrows 182 and 184, are supplied to a frame differencer 192. Alternatively, if a digital video signal is available either for the original un-watermarked video or for the suspected copy or for both, then such digital video signal(s), respectively indicated by arrows 186 and 188, may be supplied directly to the frame differencer 192. The frame differencer 192 produces a frame-by-frame difference between the digitized video data for synchronized frames 32 from the watermarked compressed video bitstream 66 or system stream 68 and from the suspected copy.

One way of determining whether the suspected copy originates with the watermarked compressed video bitstream 66 or system stream 68 is to supply, as indicated by an arrow 196, from the frame differencer 192 to a digital-to-analog converter 194 the difference between synchronized frames 32 of the suspected copy and of the watermarked compressed video bitstream 66 or system stream 68. A video monitor 202 receives an analog video signal, indicated by an arrow 204, produced by the digital-to-analog converter 194 together with the site data list 156 employed during watermarking of the compressed video bitstream 66 or the system stream 68 by the MPEG encoder 76, the broadcast transmitter 94, the CATV service 124, or even possibly the STB 112. The video monitor 202 uses the data stored in the site data entry 158 for successive sites 152 to freeze the display of watermarked frames on the video monitor 202, and to visually indicate a location on the video monitor 202 at which a watermark should appear. Visual inspection of the display presented on the video monitor 202 reveals whether or not the suspected copy originated with the watermarked compressed video bitstream 66 or system stream 68.

If the suspected copy was made from the watermarked compressed video bitstream 66 or system stream 68, then the display on the video monitor 202 at the watermarking site 152 presents one of the patterns depicted in FIG. 8. Which particular one of the patterns depicted in FIG. 8 appears on the video monitor 202 depends on the particular basis cosine curve to which watermarking was applied. The boldness of the pattern appearing on the video monitor 202 depends upon how greatly watermarking of the site 152 changed the magnitude of the coefficient of the basis cosine curve. The location of the pattern appearing on the video monitor 202 may shift one-half of the distance between a pair of immediately adjacent bars in the pattern if watermarking was effected merely by changing the coefficient's sign. Alternatively, if the suspected copy originated with an un-watermarked compressed video bitstream 66 or system stream 68, then one of the patterns depicted in FIG. 8 does not appear on the video monitor 202 at watermarking sites 152.

In addition to including the digital-to-analog converter 194 and video monitor 202 for visually detecting unauthorized copying, the system 170 depicted in FIG. 7 may also or alternatively includes a frame analyzer 212 for automatically making such a determination. Accordingly, the frame analyzer 212, similar to the combined digital-to-analog converter 194 and video monitor 202, receives both the difference between synchronized frames 32 from the un-watermarked compressed video bitstream 66 or system stream 68 and from the suspected copy, together with the site data list 156 employed during watermarking of the compressed video bitstream 66 or the system stream 68 by the MPEG encoder 76, the broadcast transmitter 94, the CATV service 124, or even possibly the STB 112. In automatically detecting unauthorized copying, the frame analyzer 212 computes DCTs 52 for the luminance blocks 44 and chrominance blocks 46 for each macroblock 38 in the frame 32 at which water-marking may appear as specified by the site data list 156.

Analogously to visually determining if the suspected copy originates with the watermarked compressed video bitstream 66 or system stream 68, in detecting an unauthorized copy the frame analyzer 212 compares the watermarked coefficient of the DCT 52 at each watermarking site 152, as specified by the site data entry 158 for that site 152, with the corresponding coefficient of the corresponding DCT 52 computed by the frame analyzer 212. While comparison of the coefficients of the DCTs 52 may be performed in various different ways, such comparison preferably includes computing a signal-to-noise ratio ("SNR") between the watermarked DCT coefficient and the un-watermarked DCT coefficients in the luminance block 44 or chrominance block 46 for the watermarked macroblock 38, or for all the un-watermarked DCT coefficients in the macroblock 38, or even for all the un-watermarked DCT coefficients in the entire frame 32. A significant likelihood exists that an unauthorized copy may, in fact, be removed by several generations of successive analog video re-recording from the initial unauthorized recording. Comparing possibly watermarked DCT coefficients by their SNR effectively measures a probability that a difference in the watermarked coefficient results from unauthorized copying rather than from distortions and/or random noise possibly introduced by the succession of analog video re-recordings. If the SNR of watermarked DCT coefficients are sufficiently large, then the suspected copy originates with the watermarked compressed video bitstream 66 or system stream 68.

To permit automatically identifying a particular path through the MPEG encoder 76, broadcast transmitter 94, satellite 106, CATV service 124 and/or STB 112 from which an unauthorized copy originates, the system 170 depicted in FIG. 7 includes a numeric decoder 222. As indicated by an arrow 224, the numeric decoder 222 receives from the frame analyzer 212 data about which watermarking sites 152 specified by the site data list 156 actually have been watermarked as determined from the SNRs computed by the frame analyzer 212. The numeric decoder 222 is programmed to interpret the meaning ascribed to the presence of watermarking at the sites 152 in accordance with a protocol by which a particular watermarking application uses the present invention to encode information about the transmission process into the watermarking sites 152.

ID for Each Set-Top Box 112

A particularly advantageous application for the present invention is uniquely identifying every STB 112. To permit precisely identifying a source from which an unauthorized copy originates, each STB 112 preferably encodes into un-compressed analog video signal a unique watermark identification. The precise form of this unique identification code is beyond the scope of the present invention. However, various enterprises supplying products and services used in distributing and receiving the compressed digital video data can adopt a protocol that specifies the unique identification. Regardless of precise form in which the STB 112 embeds the unique identification into the compressed video bitstream 66 or system stream 68, that identification will surely include information which uniquely identifies each set-top box, i.e. the watermarking effectively provides a unique set-top box serial number. In addition to the unique set-top box information, the encoded unique identification will likely also include:

1. a date and time stamp showing when the compressed digital video data was decoded;
2. an identification of the transmission channel from which the set-top box received the compressed digital video data, e.g. a television channel number; and
3. most likely, an identification of the source from which the compressed digital video data is being broadcast.

If the STB 112 adds watermarking to the compressed video bitstream 66 or system stream 68 in accordance with a standardized protocol, then the presence of that watermarking can be detected by the numeric decoder 222.

As will be readily appreciated by those skilled in the art, the quantity of data required by a watermarked television program for the site data list 156 is tiny in comparison with the quantity of data required for the compressed video bitstream 66, or for the even larger system stream 68. Accordingly, as permitted by the MPEG specification, it is practical to embed the site data entries 158 into the system stream 68 as private data, or into the compressed video bitstream 66 as user data. Alternatively, any of the MPEG encoder 76, the broadcast transmitter 94, the satellite 106, and/or CATV service 124 which autonomously selects water-marking sites 152 may transmit the site data list 156 to a subsequent the broadcast transmitter 94, the satellite 106, and/or CATV service 124 by a communication channel that is separate from the communication channel carrying the compressed video bitstream 66 or system stream 68. If the site data list 156 is transmitted separately from the compressed video bitstream 66 or system stream 68, confidentiality of data contained in the site data list 156 may be protected by using a secure data channel. Regardless of whether the site data list 156 is transmitted together with the compressed video bitstream 66 or system stream 68, or is transmitted by a separate communication channel, confidentiality of data contained in the site data list 156 may be protected by other means such as by encryption.

If a broadcast transmitter 94, satellite 106, STB 112, or CATV service 124 lacks a capability to watermark the compressed video bitstream 66 or the system stream 68, or if such capability is disabled, a compressed video bitstream 66 or system stream 68 watermarked in accordance with the present invention passes directly through without further alteration. If the site data list 156 has been embedded into the compressed video bitstream 66 or the system stream 68 by a prior MPEG encoder 76, broadcast transmitter 94, satellite 106, and/or CATV service 124, then the site data list 156 together with either the compressed video bitstream 66 or the system stream 68 passes through such watermarking disabled or inoperative broadcast transmitter 94, satellite 106, and/or CATV service 124. Only if the site data list 156 is being transmitted via a separate communication channel from that carrying the compressed video bitstream 66 or system stream 68 must the disabled or inoperative broadcast transmitter 94, satellite 106, and/or CATV service 124 possess a separate capability for receiving and retransmitting the site data list 156 in order to preserve the site data list 156 for subsequent use in embedding watermarks.

To further secure watermarks embedded into the compressed video bitstream 66 or system stream 68, the MPEG encoder 76, the broadcast transmitter 94, the satellite 106, and/or the CATV service 124 may omit from the transmitted or re-transmitted site data list 156 site data entries 158 for those sites 152 into which watermarking has been embedded. In this way an immediately subsequent broadcast transmitter 94, satellite 106, STB 112, or CATV service 124 receives a site data list 156 containing site data entries 158 for only those sites 152 which have not been used thus far for watermarking. Therefore, such subsequent broadcast transmitter 94, satellite 106, STB 112, or CATV service 124 cannot readily determine from the compressed video bitstream 66 or system stream 68 the location of watermarked sites 152, or even if water-marking has already been applied to the compressed video bitstream 66 or system stream 68.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method for adding a watermark to a compressed video bitstream comprising the steps of:

selecting a plurality of sites within the compressed video bitstream that encode a discrete cosine transform ("DCT") coefficient which is apt for modification to embed a watermark into the compressed video bitstream;

modifying the DCT coefficient for at least some of the selected plurality of sites so the modified DCT coefficient occupies a number of bits in the compressed video bitstream that does not exceed a number of bits occupied by that same DCT coefficient before modification, thereby embedding the watermark into the compressed video bitstream; and transmitting the watermarked compressed video bitstream containing the modified DCT coefficients.

2. The method for adding a watermark to a compressed video bitstream of claim 1 wherein at least one of the selected plurality of sites encode DCT coefficients having a run-length of zero.

3. The method for adding a watermark to a compressed video bitstream of claim 1 wherein a variable length code ("VLC") for the modified DCT coefficient occupies a number of bits in the compressed video bitstream that is identical to a number of bits occupied by that same DCT coefficient before modification.

4. The method for adding a watermark to a compressed video bitstream of claim 1 wherein at least one of the selected plurality of sites is located in a Moving Pictures Experts Group ("MPEG") B Frame.

5. The method for adding a watermark to a compressed video bitstream of claim 1 wherein the compressed video bitstream is included in a system stream.

6. The method for adding a watermark to a compressed video bitstream of claim 1 further comprising the step of:
   receiving the compressed video bitstream before selecting the plurality of sites.

7. The method for adding a watermark to a compressed video bitstream of claim 1 further comprising the step of:
   generating the compressed video bitstream by compressing a received video signal concurrently with selecting the plurality of sites.

8. The method for adding a watermark to a compressed video bitstream of claim 1 further comprising the step of:
   generating the compressed video bitstream by compressing a received video signal before selecting the plurality of sites.

9. The method for adding a watermark to a compressed video bitstream of claim 1 further comprising the step of:

also transmitting site data specifying sites within the compressed video bitstream which are apt for modification to embed a watermark into the compressed video bitstream.

10. The method for adding a watermark to a compressed video bitstream of claim 1 wherein when the modified DCT coefficient occupies a number of bits that is less than a number of bits occupied by that same DCT coefficient before modification, a number of zeros (0's) are prefixed onto the modified DCT coefficient so a total of:

the number of bits in the modified DCT coefficient; plus the number of bits in the added zeros (0's); is identical the number of bits occupied by the DCT coefficient before modification.

11. A method for adding a watermark to a compressed video bitstream comprising the steps of:

receiving the compressed video bitstream together with site data specifying a plurality of sites within the compressed video bitstream which are apt for modification to embed a watermark into the compressed video bitstream;

modifying a DCT coefficient for at least some of the plurality of sites specified by the received site data thereby embedding the watermark into the compressed video bitstream; and re-transmitting the watermarked compressed video bitstream containing the modified DCT coefficients.

12. The method for adding a watermark to a compressed video bitstream of claim 11 wherein the received compressed video bitstream is included in a system stream.

13. The method for adding a watermark to a compressed video bitstream of claim 11 further comprising the step of:

also transmitting at least some of the site data specifying sites within the compressed video bitstream which are apt for modification to embed a watermark into the compressed video bitstream.

14. A method for adding a watermark to a compressed video bitstream comprising the steps of:

selecting a plurality of sites within the compressed video bitstream that encode a DCT coefficient which is apt for modification to embed a watermark into the compressed video bitstream; and transmitting both the compressed video bitstream and site data specifying the selected plurality of sites within the compressed video bitstream which are apt for modification to embed a watermark into the compressed video bitstream.

15. The method for adding a watermark to a compressed video bitstream of claim 14 wherein the compressed video bitstream is included in a system stream.

16. The method for adding a watermark to a compressed video bitstream of claim 14 wherein at least one of the selected plurality of sites encode DCT coefficients having a run-length of zero.

17. The method for adding a watermark to a compressed video bitstream of claim 14 wherein at least one of the modified DCT coefficient occupies a number of bits in the compressed video bitstream that is identical to a number of bits occupied by that same DCT coefficient before modification.

18. The method for adding a watermark to a compressed video bitstream of claim 14 wherein at least one of the selected plurality of sites is located in a MPEG B Frame.

19. A method for adding a watermark to a video signal comprising the steps of:

receiving the compressed video bitstream together with site data specifying a plurality of sites within the compressed video bitstream which are apt for modification to embed a watermark into the compressed video bitstream;

modifying a DCT coefficient for at least some of the plurality of sites thereby embedding the watermark into the compressed video bitstream; and decoding the watermarked compressed video bitstream containing the modified DCT coefficients to produce therefrom a video signal that is suitable for display on a television set, and that has the watermark embedded therein.

20. The method for adding a watermark to a video signal of claim 19 wherein the received compressed video bitstream is included in a system stream.

21. A method for adding a watermark to a video signal comprising the steps of:

receiving the compressed video bitstream;

selecting a plurality of sites within the compressed video bitstream that encode a DCT coefficient which is apt for modification to embed a watermark into the compressed video bitstream;

modifying the DCT coefficient for at least some of the selected plurality of sites so the modified DCT coefficient occupies a number of bits in the compressed video bitstream that does not exceed a number of bits occupied by that same DCT coefficient before modification, thereby embedding the watermark into the compressed video bitstream; and decoding the compressed video bitstream containing the modified DCT coefficients to produce therefrom a video signal that is suitable for display on a television set, and that has the watermark embedded therein.

22. The method for adding a watermark to a video signal of claim 21 wherein the received compressed video bitstream is included in a system stream.

23. The method for adding a watermark to a video signal of claim 21 wherein at least one of the selected plurality of sites encode DCT coefficients having a run-length of zero.

24. The method for adding a watermark to a video signal of claim 21 wherein a VLC for the modified DCT coefficient occupies a number of bits in the compressed video bitstream that is identical to a number of bits occupied by that same DCT coefficient before modification.

25. The method for adding a watermark to a video signal of claim 21 wherein at least one of the selected plurality of sites is located in a MPEG B Frame.

26. The method for adding a watermark to a video signal of claim 21 wherein when the modified DCT coefficient occupies a number of bits that is less than a number of bits occupied by that same DCT coefficient before modification, a number of zeros (0's) are prefixed onto the modified DCT coefficient so a total of:

the number of bits in the modified DCT coefficient; plus the number of bits in the added zeros (0's); is identical the number of bits occupied by the DCT coefficient before modification.

27. A system for detecting an unauthorized copy of a video by identifying a watermark that has been embedded into a compressed video bitstream produced from an un-watermarked video by changing values of selected DCT coefficients at watermarking sites in the compressed video bitstream, the system comprising:

an original video input for receiving a video signal of the un-watermarked video;

a copy video input for receiving a video signal of the copy of the video which may possibly include the watermark;

a frame differencer that receives from said original video input and from said copy video input the video signals received thereat, said frame differencer producing a synchronized, frame-by-frame difference between the video signal received by said original video input and the video signal received by said copy video input; and watermark identification means that receives the frame-by-frame difference produced by said frame differencer and also receives a site list containing data which specifies characteristics of sites at which the watermark may be embedded into the video signal received by said copy video input, said watermark identification means permitting detection of the watermark embedded into the video signal received by said copy video input.

28. The system of claim 27 wherein:

said original video input receives an analog video signal; and the system further includes a video digitizer for digitizing the analog video signal received by said original video input, and for supplying the digitized video signal thus produced to said frame differencer.

29. The system of claim 27 wherein:

said copy video input receives an analog video signal; and the system further includes a video digitizer for digitizing the analog video signal received by said copy video input, and for supplying the digitized video signal thus produced to said frame differencer.

30. The system of claim 27 wherein said watermark identification means includes:

a digital-to-analog converter for receiving the frame-by-frame difference produced by said frame differencer and for converting the received frame-by-frame difference into an analog video signal; and a video monitor for receiving the analog video signal produced by said digital-to-analog converter and for visually displaying watermarking sites.

31. The system of claim 27 wherein said watermark identification means includes a frame analyzer for receiving the frame-by-frame difference produced by said frame differencer and for automatically determining if a watermark occurs at a watermarking site.

32. The system of claim 31 wherein in determining if a watermark occurs at a watermarking site said frame analyzer computes a signal-to-noise ratio ("SNR") between:

the DCT coefficient at the watermarking site in a discrete cosine transform ("DCT") computed from the frame-by-frame difference produced by said frame differencer; and other coefficients of the DCT computed from the frame-by-frame difference.

* * * * *